US005606362A

United States Patent [19]

Lee

[11] Patent Number: 5,606,362

[45] Date of Patent: Feb. 25, 1997

[54] VARIABLE BIT RATE AUDIO INFORMATION TRANSMITTING APPARATUS, AND METHOD THEREFOR

[75] Inventor: Myung S. Lee, Kyoungki-do, Rep. of Korea

[73] Assignee: Hyundai Electronics Industries Co., Ltd., Rep. of Korea

[21] Appl. No.: 469,223

[22] Filed: Jun. 6, 1995

[30] Foreign Application Priority Data

Dec. 30, 1994 [KR] Rep. of Korea ...................... 94-39864

[51] Int. Cl.$^{6}$ ...................................................... H04N 7/14

[52] U.S. Cl. .............................................. 348/17; 348/423

[58] Field of Search ................................ 348/484, 15, 17, 348/423, 390; 381/29; H04N 7/14

[56] References Cited

U.S. PATENT DOCUMENTS

| | | | |
|---|---|---|---|
| 5,231,492 | 7/1993 | Dangi et al. | 348/17 |
| 5,278,909 | 1/1994 | Edgar . | |
| 5,365,265 | 11/1994 | Shibata et al. | 348/17 |
| 5,481,543 | 1/1996 | Veltman | 348/423 |

FOREIGN PATENT DOCUMENTS

| | | |
|---|---|---|
| 6-111540 | 4/1994 | Japan . |

*Primary Examiner*—Victor R. Kostak
*Attorney, Agent, or Firm*—Merchant, Gould, Smith, Edell, Welter & Schmidt

[57] ABSTRACT

A variable bit rate audio information transmitting apparatus, and a method therefor, are disclosed in which a bit rate is properly increased or decreased in accordance with the amount of audio information and by taking a fixed bit transmitting rate as a reference, so that the data rate can be adjusted in accordance with the importance of the audio information. The data bit amount of the currently inputted frames are computed to compare with a fixed bit allocation amount, and surplus bits and dummy data are properly allocated to the compared result, so that the bit amount allocated to the inputted data amount can be varied in transmitting the signals. The bit distribution is efficiently carried out through bit amount variation adjustment in accordance with the amount of sound source. Therefore the sound quality is improved, the deterioration of the sound quality is reduced, and the audio data is reduced. Further, the amount of the dummy data is reduced within the bit stream so that the bit utilization can be improved.

2 Claims, 3 Drawing Sheets

VARIABLE BIT RATE AUDIO INFORMATION TRANSMITTING APPARATUS, AND METHOD THEREFOR

BACKGROUND OF THE INVENTION

1. Field of the Invention

The present invention relates to a variable bit rate audio information transmitting apparatus, and a method therefor, in which a bit rate is properly increased or decreased in accordance with the amount of audio information and by taking a fixed bit transmitting rate as a reference, so that the data rate can be adjusted in accordance with the importance of audio information.

2. Description of the Prior Art

Generally, the currently used system stream apparatus sends audio information at fixed bit rate, and therefore, a weight cannot be given in accordance with the information amount. Consequently, surplus data are generated in large amounts, and therefore, dummy data have to be filled, thereby making the system inefficient. On the other hand, in the case where a sound source requires a large information amount, the bit amount to be allocated is insufficient, and therefore, the system can only used for limited bit amounts. Therefore, there is a limit in the improvement of sound.

Meanwhile, Japanese Patent Laid-open No. Hei-6-111540 discloses a method for controlling a sound recording medium under the title of "Method for Controlling Magnetic Tape Apparatus". In this magnetic tape apparatus, there is provided main tracks for recording and reproducing digital signal blocks of each music unit. Further, control signals are recorded for reconstituting the signals reproduced from the main tracks. Further, along the main tracks, there are provided auxiliary tracks for measuring the running position of the magnetic tape based on the recorded control signals. That is, content information including the sequence of the digital clock signals and their recording positions are recorded on the auxiliary tracks. Further, marker signals representing the beginning positions of the respective digital signal blocks are recorded on the auxiliary tracks. Based on the content information and on the marker signals, the measured running position is corrected. Therefore this apparatus cannot solve the above described conventional problem.

SUMMARY OF THE INVENTION

The present invention is intended to overcome the above described disadvantages of the conventional technique.

Therefore it is the object of the present invention to provide a variable bit rate audio information transmitting apparatus, in which the data bit amount of the currently inputted frames are computed to compare it with a fixed bit allocation amount, and surplus bits and dummy data are allocated properly to the compared result, so that the bit amount allocated to the inputted data amount can be varied in transmitting the signals.

In achieving the above object, the video or audio data transmitting apparatus according to the present invention includes: a video buffer for storing inputted video data; a bit allocating processor for carrying out a bit allocation to compress inputted audio data; a counter for counting the bit allocation amount for the current frame outputted from the bit allocation processor; a reference bit rate device for outputting a fixed bit allocation amount which is made to be suitable to the system stream apparatus by a user; a comparator for comparing an output value of the counter with an output value of the reference bit rate device; a bit rate adjuster for computing a dummy data and an effective bit amount which is made suitable to the currently inputted frame based on the output value of the comparator; a varying device including a dummy data counter for storing the dummy data of the bit rate adjuster, and for outputting them to a format device upon being necessary; a formatting device for formatting the output audio data of the bit allocation processor and the varying device suitably to the system output format; and an encoder for encoding the out put data of the video buffer and the formatting device.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
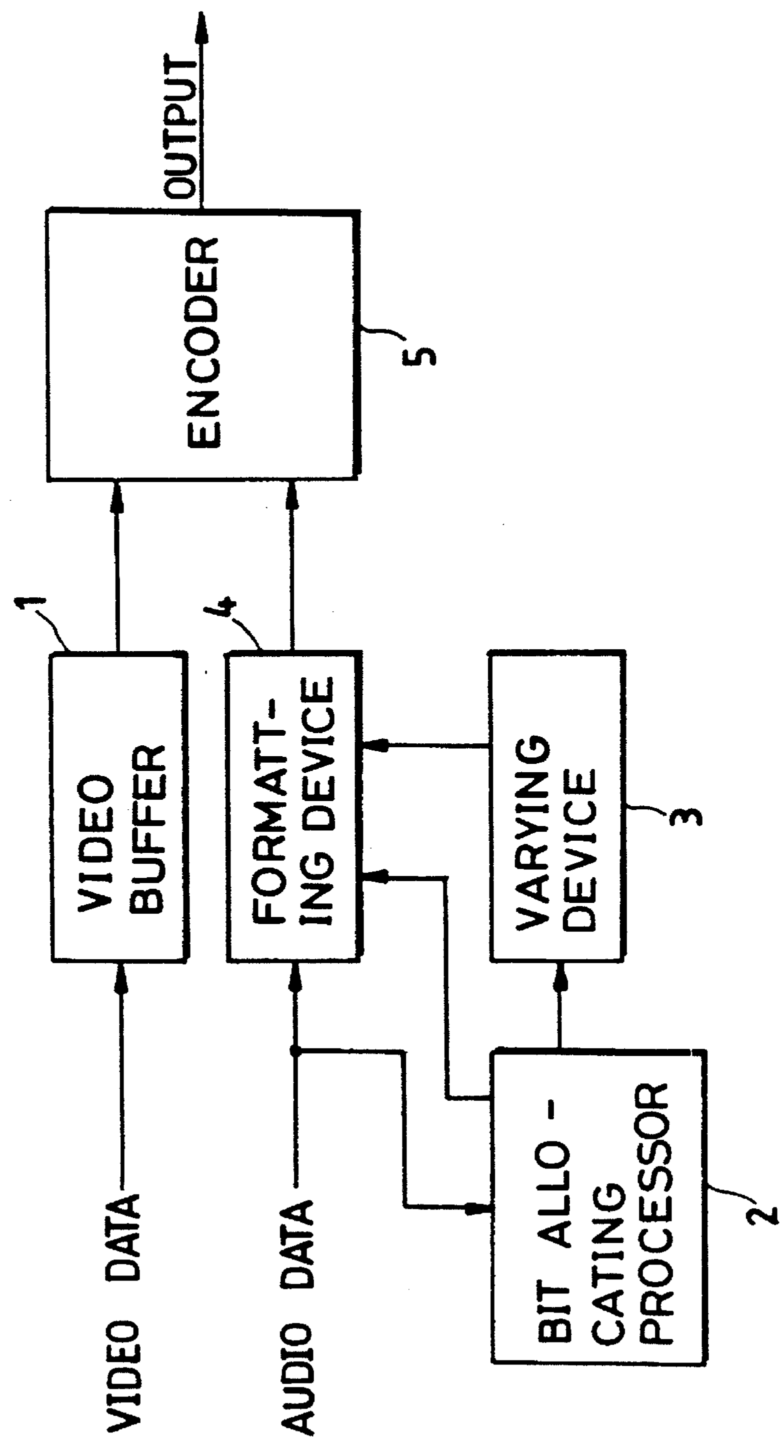
FIG. 1 is a block diagram showing the constitution of the apparatus according to the present invention.
Figure 2:
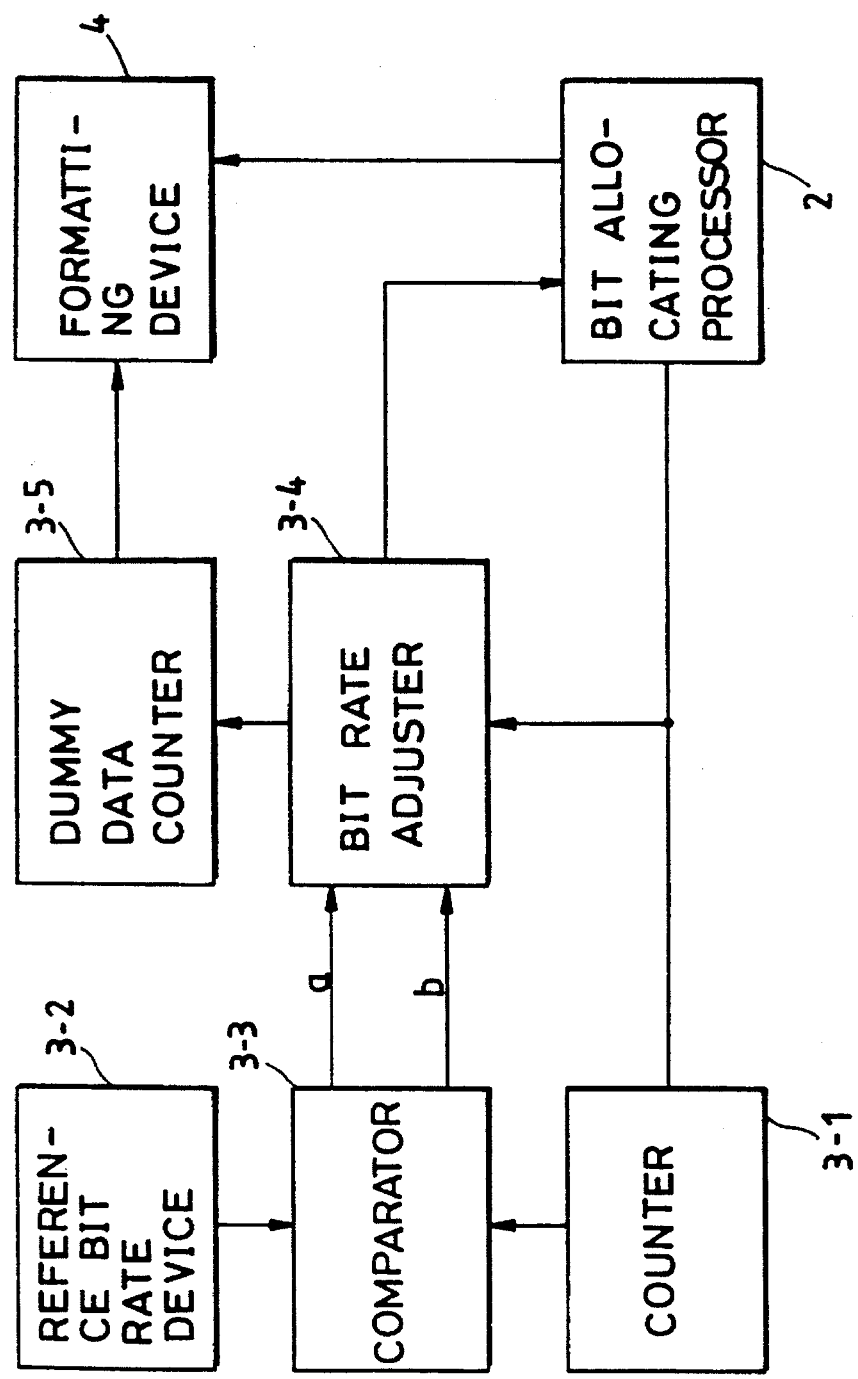
FIG. 2 is a block diagram showing the constitution of the varying device of FIG. 1.

FIG. 1 is a block diagram showing the constitution of the apparatus according to the present invention, and as shown in this drawing, the apparatus is constituted as follows.

That is, the apparatus includes: a video buffer 1 for storing inputted video data; a bit allocating processor 2 for carrying out a bit allocation to compress inputted audio data; a varying device 3 including a dummy data counter for storing the dummy data of the bit rate adjuster, and for outputting them to a formatting device upon being necessary; the formatting device 4 formatting the output audio data of the bit allocation processor 2 and the varying device 3 suitably to the system output format; and an encoder 5 for encoding the output data of the video buffer 1 and the formatting device 4.

The varying device 3 includes: a counter 3-1 for counting the bit allocation amount for the current frame outputted from the bit allocation processor 2; a reference bit rate device 3-2 for outputting a fixed bit allocation amount which is made to be suitable to the system stream apparatus by a user; a comparator 3-3 for comparing an output value of the counter with an output value of the reference bit rate device; a bit rate adjuster 3-4 for computing dummy data and an effective bit amount which is made suitable to the currently inputted frame based on the output value of the comparator 3-3; and a dummy data counter 3-5 for storing the dummy data of the bit rate adjuster, and for outputting them to a formatting device upon being necessary;

The apparatus of the present invention constituted as above will now be described as to its operation.

When video and audio signals, i.e., video data and audio data are inputted, they are inputted into the video buffer 1 and the bit allocating processor 2.

When the audio data are inputted into the bit allocating processor 2, the bit allocating processor 2 outputs its output value to the counter 3-1. The counter 3-1 which has received the current frame data calculates the bit allocation amount for occupation of the data, and outputs its output to the comparator 3-3. The comparator 3-3 compares the bit allocation amount of the counter 3-1 with a fixed bit allocation amount N of the reference bit rate device 3-2. The difference value as a result of the comparison (the difference value will be indicated by "dif") is outputted to the bit rate adjuster 3-4. Under this condition, if the fixed bit allocation amount is larger than the bit allocation amount of the current frame data, then the difference value dif is outputted to an output line a. On the other hand, if the fixed bit allocation amount is smaller than the bit allocation amount of the current frame data, then the difference value dif is outputted to an output line b.

The bit rate adjuster 3-4 which has received the difference value dif computes the effective bit allocation amount of the current frame and the dummy data to output them to the formatting device 4 which then finally formats the two sets of data.

Figure 3:
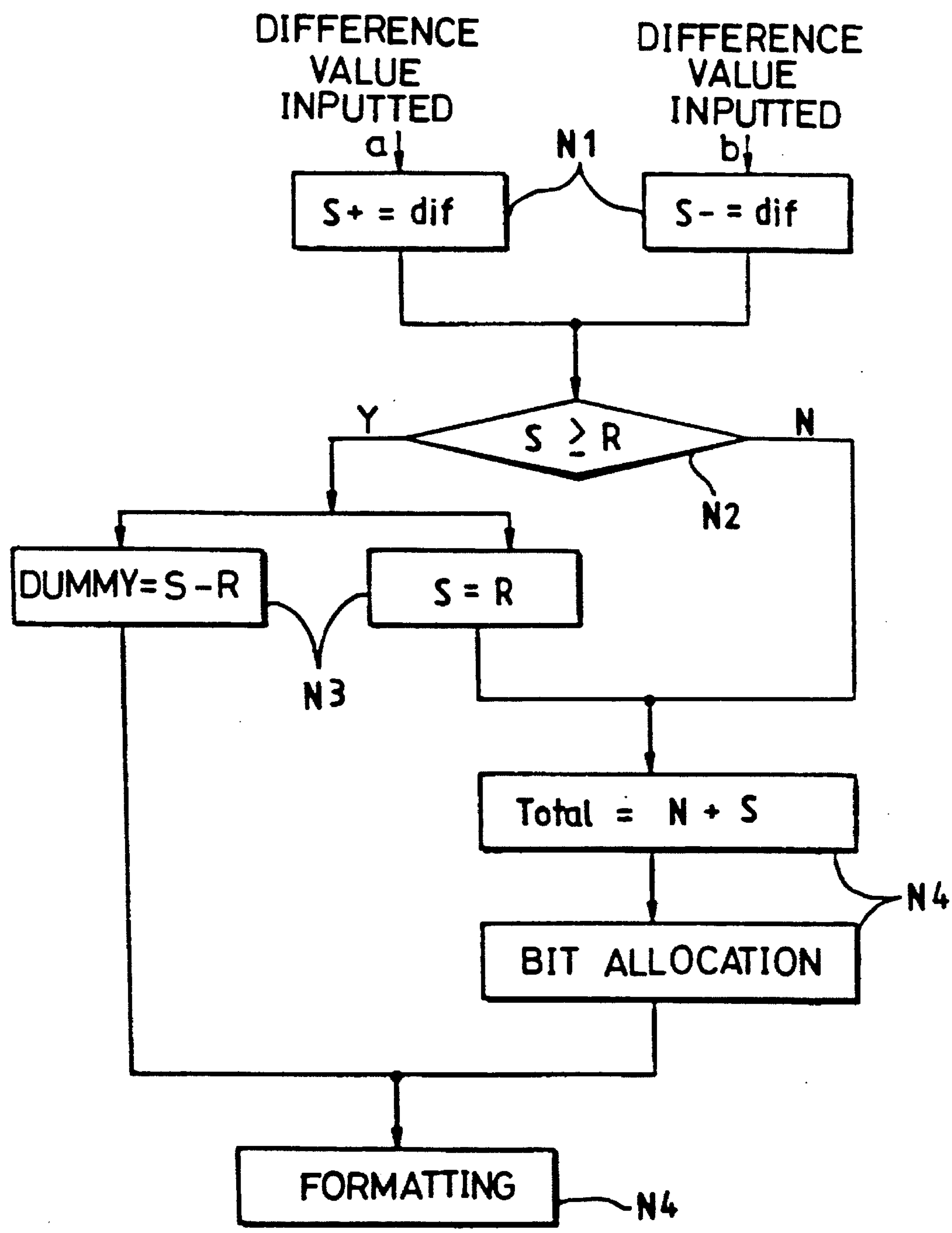
FIG. 3 is a flow chart showing the computing process for the dummy data and the effective bit amount.

The method by which the bit rate adjuster 3-4 computes the dummy data and the effective bit allocation amount for the current frame will be described in detail referring to the flow chart of FIG. 3.

The method includes the steps of: computing a surplus bit S based on the difference value dif if the comparator 3-3 outputs the difference value dif between the fixed bit allocation amount and the bit allocation amount for the current frame, and accumulating this difference value dif (the variable for accumulating the difference value is indicated by S) to obtain a final surplus bit amount S if the difference value dif is outputted through an output line a of the comparator 3-3, and computing the final surplus bit amount S by subtracting the difference value dif from the accumulated value S if the difference value dif is outputted through an output line b of the comparator 3-3 (first step N1); checking as to whether the value S of the first step N1 is larger than a value R (which is arbitrarily determined by the user, and this value R is smaller than the fixed bit allocation amount) (second step N2); storing into a dummy variable the surplus bit amount S minus the user defined value R so as to compute the dummy data if the surplus bit amount S of the second step N2 is equal to or larger than the user defined value R, and replacing the surplus bit variable S with the user defined value R before carrying a fourth step N4 (third step N3); and computing a total bit allocation amount allocable to the current frame by adding the surplus bit amount to the fixed bit allocation amount to carry out a bit allocation if the surplus bit amount S of the second step N2 is smaller than the user defined value R, and outputting the current frame data to the formatting device 4 so as to be formatted (fourth step N4).

Here, the bit amount transmitted to the formatting device 4 equals to the dummy data amount (computed at the third step N3) plus the bit allocation amount of the fourth step N4.

For facilitation of understanding, an example will be presented as shown in Table 1 below.

TABLE 1

| Frame | Bit allocation amount | Surplus bits (S) | Total bits |
|---|---|---|---|
| First | 9 | 1 | 11 |
| Second | 9 | 2 | 12 |
| Third | 11 | 1 | 11 |
| Fourth | 5 | 6 | 16 |
| Fifth | 13 | 3 | 13 |
| . | | | |
| . | | | |
| . | | | |

If it is assumed that R=5 and N=10 in Table 1 above, the amount of the surplus bits is larger than the value R, and therefore, S and R are sent as dummy data. That is, in the fourth frame, 6 bits are transmitted, the 6 bits consisting of 1 bit of dummy data calculated at S–R=1 and 5 bits as the bit allocation amount.

Through the above described process, the currently inputted audio data amount is analyzed. Thus a bit amount larger than the reference bit amount is allocated for a frame having a large amount of data. On the other hand, for a frame having a small amount of data, a bit amount smaller than the reference bit amount is allocated and transmitted, so that the bit rate can be efficiently varied.

Under this condition, the varied audio data are encoded by the encoder together with the video data, and therefore, the total transmitting rate is same as that of the conventional system in which the video information is loaded. Therefore, at the decoding end, a decoding becomes possible without an addition of hardware as in the case of the i0 conventional system. Further, the audio information which is varied as described above is averaged, and therefore, the bit rate of the present invention becomes the same as that of the conventional system.

According to the present invention as described above, the bit distribution is efficiently carried out through bit amount variation adjustment in accordance with the amount of sound source. Therefore, the sound quality is improved, the deterioration of the sound quality is reduced, and the audio data amount is reduced. Further, the amount of the dummy data is reduced within the bit stream, so that the bit utilization can be improved.

What is claimed is:

1. A method for transmitting variable bit rate audio information with video information, comprising the steps of:

computing a first bit allocation amount for the audio information for a current frame;

comparing the first bit allocation amount with a second fixed bit allocation amount to obtain a compared result, the comparing step further comprising outputting the compared result on a first output line connected between a comparator and a bit rate adjuster when the first bit allocation amount is greater than the second fixed bit allocation amount and outputting the compared result on a second output line connected between the comparator and the bit rate adjuster when the first bit allocation amount is less than the second fixed bit allocation amount;

allocating to the current frame an effective bit rate allocation and dummy data based on the compared result, the step of allocating the effective bit rate allocation and the dummy data comprising a) accumulating a difference value to obtain a final surplus bit amount if said difference value is outputted through the first output line of the comparator, and computing said final surplus bit amount by subtracting said difference value from an accumulated value if said difference value is outputted through the second output line of the comparator, (b) checking whether a value of said surplus bit amount of step a) is larger than a user defined value smaller than said second fixed bit allocation amount, c) storing said surplus bit amount minus said user defined value into a dummy variable so as to compute dummy data if said surplus bit amount is equal to or larger than said user defined value, and replacing a surplus bit variable with said user defined value, and d) computing an effective bit allocation amount to be allocated to the current frame by adding said surplus bit amount to said second fixed bit allocation amount so as to carry out a bit allocation if said surplus bit amount is smaller than said user defined value, and outputting current frame data to a formatting device so as to be formatted; and encoding and transmitting the audio and video information;

whereby the effective bit allocation is varied in accordance with inputted audio information amount relative to a fixed amount.

2. A variable bit rate audio data transmitting apparatus for transmitting video and audio data, comprising:

a video buffer for storing inputted video data for a current frame;

a bit allocation processor for providing a first bit allocation amount to compress inputted audio data for the current frame;

a varying device for comparing the first bit allocation amount with a second fixed bit allocation amount to obtain a compared result and for varying an effective bit rate allocation depending on the compared result;

a formatting device for formatting output audio data of said bit allocation processor and said varying device to a system output format; and an encoder for encoding video data of said video buffer and audio data of said formatting device;

said varying device including a counter for counting the first bit allocation amount for the current frame, a reference bit rate device for outputting the second fixed bit allocation amount, a comparator for comparing the first and second bit allocation amounts to obtain the compared result, a bit rate adjuster for computing a dummy data amount and effective bit rate allocation, and a dummy data counter for storing dummy data from said bit rate adjuster and for outputting to said formatting device;

wherein first and second output lines communicate between said comparator and said bit rate adjuster, said first output line being used when the first bit allocation amount is greater than the second fixed bit allocation amount and said second output line being used when the first bit allocation amount is less than the second fixed bit allocation amount and effective bit rate allocation is varied depending on the compared result of first and second bit allocation amounts so that greater or lesser amounts of audio data can be encoded with the video data of said current frame.

* * * * *